United States Patent [19]

Houlmiere

[11] 3,829,968
[45] Aug. 20, 1974

[54] PRUNING TOOL

[76] Inventor: Emilien V. Houlmiere, 9025 St. Croix Trl. Rt. 4, Denmark Township, Washington County, Minn. 55033

[22] Filed: July 13, 1973

[21] Appl. No.: 378,923

[52] U.S. Cl............... 30/190, 30/246, 30/251, 30/272 R
[51] Int. Cl............................................. B26b 17/02
[58] Field of Search........... 30/246, 251, 272 R, 190

[56] References Cited
UNITED STATES PATENTS
945,677   1/1910   Bastian ................................ 30/251
2,550,874  5/1951   Skoog .................................. 30/190

FOREIGN PATENTS OR APPLICATIONS
9,958    11/1907   Great Britain ...................... 30/246
426,649   5/1911   France ................................ 30/251
473,147   7/1952   Italy .................................... 30/251

Primary Examiner—Al Lawrence Smith
Assistant Examiner—J. T. Zatarga
Attorney, Agent, or Firm—G. A. Ellestad

[57] ABSTRACT

A pump action pruning tool is formed with a long tube having cutting jaws carried at its upper end which are adapted to be operated by a member shorter than the tube and slidably mounted on the tube for manual reciprocation thereon. A lazy tong structure comprising a series of crossed pivotally connected pairs of levers is connected between the respective lower ends of the tube and member. Positioned within the tube is a rod having its upper end connected to a movable jaw and its lower end connected to the lazy tong structure at a point which is close to the lower end of the tube whereby a relatively large downward movement of the member will produce a much shorter movement of the rod under increased force to effect cutting action. Movement of the member in the opposite direction will cause the jaws to open.

5 Claims, 5 Drawing Figures

PATENTED AUG 20 1974 3,829,968
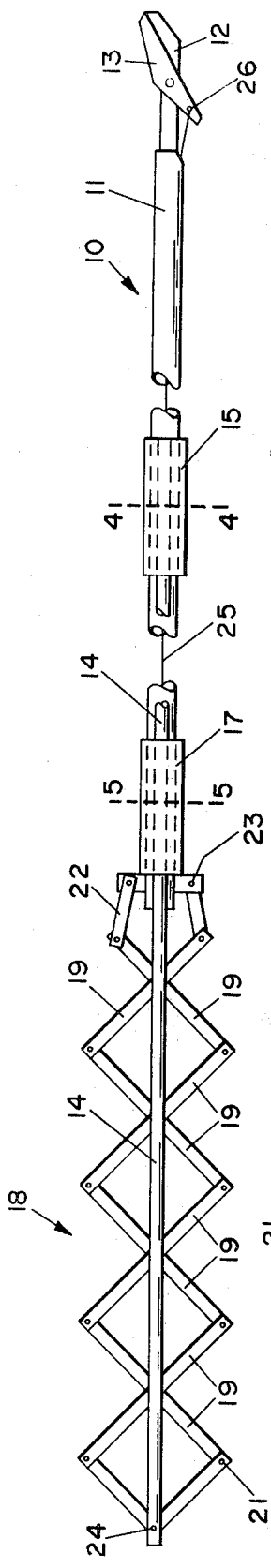
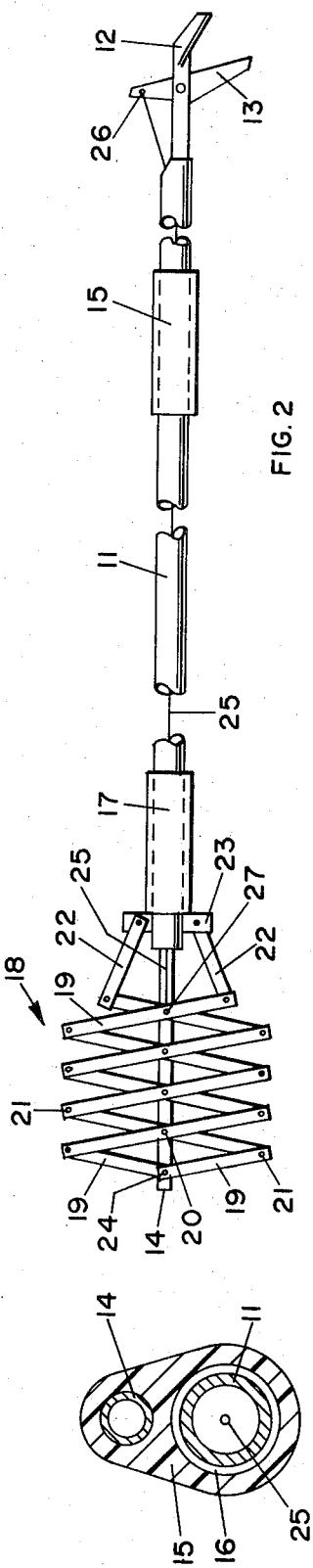
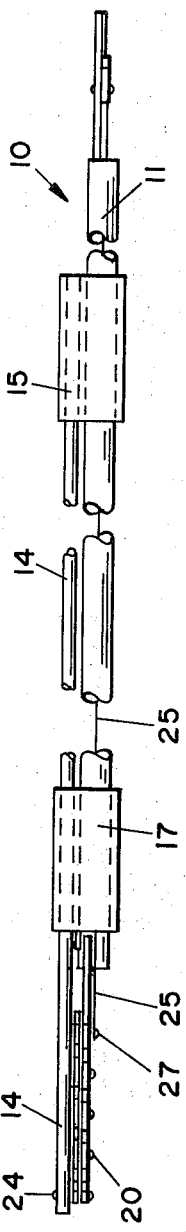
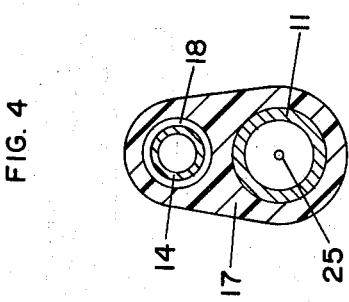
FIG. 1
FIG. 2
FIG. 3
FIG. 4
FIG. 5

PRUNING TOOL

BACKGROUND OF THE INVENTION

This invention relates to pruning tools and more particularly it has reference to pole type pruners wherein the cutting jaws are carried at the end of a pole and are adapted for pruning tree branches without the use of a ladder. One commonly used pruner of this type has a hook portion adapted to be hooked over the top of a branch and with the cutting action provided by a blade which is moved by pulling on a rope attached to a lever arm on the blade. Such a pruner is unwieldy and cumbersome to handle among the branches of a tree because of the long lever arm and attached rope. Furthermore, with this type of pruner it is not possible to remove a small branch by a cut close to a larger branch or trunk due to the hook which is placed over the top of the branch. In apple orchards, for example, it is necessary that the trees be properly pruned to insure maximum productivity and approved culture. While hydraulically operated pole pruners overcome some of the disadvantages of the old type devices, they are relatively complicated and hence expensive. In addition, they require the presence of a power driven compressor and a pressure hose which is inconvenient to handle and is apt to get tangled as the operator encircles a tree in the systematic pruning thereof.

SUMMARY OF THE INVENTION

Objects of the invention are to provide a pole type pruning tool which will be relatively simple in structure yet efficient in operation, manually operable with multiplied force transmitted to the cutting jaws and easily handled and positioned for use among the branches of a tree due to its compact structure.

According to the invention, a pole type pruning tool manually operable by pump or reciprocating action is provided by an elongate first member in the form of a tube on which is slidably carried a second elongate member for reciprocation thereon. Mounted on the upper end of the first member is a pair of cutting jaws with at least one jaw movable to effect the cutting operation. Connected to and between the respective lower end portions of the two members is a lazy tong structure comprising a series of crossed pairs of levers pivotally connected to one another. Positioned within the tube is a rod having its upper end connected to a movable jaw and its lower end connected to the lazy tong structure at a point which is quite close to the lower end of the first member and is in alignment with the intersecting points of the crossed levers.

Because of the lazy tong structure, it will be apparent that the movement of the second or slidable member will be greater than that of the rod and that the force used to reciprocate the second member will be multiplied and transmitted through the rod to the movable cutting jaw. When the second member is moved upwardly by a full stroke, the lazy tong structure is compressed or shortened and the jaws are opened to receive a branch to be cut. By moving the second member downwardly a full stroke, the lazy tong structure is extended and the force applied is multiplied and transmitted through the rod to the movable jaw to effect cutting action.

BRIEF DESCRIPTION OF THE DRAWINGS

FIG. 1 is a top elevational view of the pruning tool embodying the invention and showing the relation of the parts with the jaws in closed position.

FIG. 2 is a bottom elevational view showing the relation of the parts when the jaws are in open position.

FIG. 3 is a side elevational view of the tool with the parts in position as in FIG. 2.

FIG. 4 is an enlarged sectional view taken on line 4—4 of FIG. 1.

FIG. 5 is an enlarged sectional view taken on line 5—5 of FIG. 1.

DESCRIPTION OF PREFERRED EMBODIMENT

A preferred embodiment of the invention is shown in the drawings wherein 10 indicates, generally, a pruning tool having a first elongate member 11 which is preferably in the form of an aluminum tube. The upper end of tube 11, located at the right as the figures are viewed, carries a fixed jaw 12 and a movable jaw 13 having a cutting edge with the pair of jaws coacting to provide cutting action. The operating movement of jaw 13 is provided by a second elongate member 14, also preferably formed of aluminum tubing, having a diameter smaller than that of tube 11. The member 14 is shorter than the tube 11 and it extends along and is slidably carried on tube 11 by means of a plastic handle 15 which is fixed to the upper part of member 14 and has an aperture 16 through which the tube 11 freely slides, as shown in FIG. 4. Another plastic handle 17 is fixed to the lower end portion of tube 11 and it has an aperture 18 through which the member 14 may slide freely, as shown in FIG. 5.

Since the pruning tool is to be operated manually by reciprocation of member 14, it is essential that the force applied be multiplied so that the cutting action may be effected with a minimum of effort. This is accomplished by lever means of the lazy tong type indicated, generally, at 18 and comprising a plurality of pairs of crossed levers 19 which are pivotally connected at the intersection 20 of each pair of levers and also at their end portions 21. The lever means are pivotally connected in end-to-end relation between and to the respective lower end portions of the two members with the lever means connected to the lower end of member 11 by a pair of links 22 pivoted to a bar 23 fixed to the lower end of member 11. The other or lower part of the lever means is pivotally connected to the lower end portion of member 14 as indicated at 24.

Actuation of the movable jaw 13 to provide cutting action is effected by means of a stiff wire or rod 25 which is positioned within the tube member 11 and has its upper end pivotally connected to the downwardly extending portion of jaw 13 as shown at 26. The lower end of rod 25 is connected to the lever means at the pivot 27 which is located at the intersection of the pair of levers 19 closest to the lower end of tube member 11.

In operation, the pruning tool is held with one hand grasping handle 15 and the other hand grasping handle 17. With the lever means 18 in a compressed relation as shown in FIGS. 2 and 3, the upwardly extending jaws 12 and 13 are spread apart in open relation to receive a tree branch to be cut. Downward movement of handle 15 will move the member 14 downwardly and also the attached lower end of the lever means and the rod 25 which is attached to the lever means adjacent to the lower end of member 11. The force applied to member 14 will be multiplied and transmitted to rod 25 to thereby provide a powerful cutting stroke for movable jaw 13. While the handle 15 and attached member 14 will move a relatively long distance the rod 25, because of the action of the lever means, will move a relatively short distance whereby a long working stroke will be translated into a short, powerful cutting stroke of jaw 13.

From the foregoing, it will be apparent that there has been provided a pruning tool which is compact in structure, manually operable and capable of providing relatively powerful cutting strokes. The invention has been embodied in a successfully operating pruning tool in which the member 11 was formed of an aluminum tube about 10 feet long and the movable member 14 formed of an aluminum tube about 5 feet long. Moving the member 14 an operating stroke of 62 inches produces a movement of rod 25 a distance of 2.25 inches. A shoulder strap attached to the upper and lower portions of member 11 will enable the operator to support the weight of the tool on his shoulder and thus provide ease and convenience in use. Various modifications may be made obviously without departing from the spirit of the invention as pointed out in the appended claims.

I claim:

1. A tree pruning tool comprising a first elongate member, a pair of jaws carried at the upper part of the first member, at least one of the jaws being movable and having a cutting edge, means to move at least one of the jaws to effect cutting action by the jaws comprising a second elongate member slidably carried by and extending along the first member for manual reciprocation thereon, lever means comprising a plurality of crossed pairs of levers pivotally connected to one another at their center and end portions, said lever means being pivotally connected in end-to-end relation between and to the respective lower end portions of the two members, and a rod extending along the first member and having its upper end portion operatively connected to a movable jaw and its lower end portion connected to the lever means at a point which is adjacent to the lower end portion of the first member whereby a relatively large movement of the second member in one direction will produce a much smaller movement of the rod in the same direction under increased force to provide cutting action by the jaws and an opposite movement of the second member will produce separation of the jaws.

2. The pruning tool according to claim 1 wherein the first elongate member is longer than the second member, the first member is in the form of a tube and the rod is positioned within the tube.

3. The pruning tool according to claim 1 wherein the upper end portion of the rod is pivotally connected to the movable jaw and the lower end portion of the rod is connected to the lever means at a point of intersection of the pair of levers closest to the lower end of the first member.

4. The pruning tool according to claim 1 wherein the jaws extend upwardly, the movable jaw has a downwardly extending portion to which the upper end of the rod is pivotally connected whereby a relatively large downward movement of the second member will produce a much shorter movement of the rod to move a jaw into cutting action and an upward movement of the second member will move the rod upwardly to produce separation of the jaws.

5. The pruning tool according to claim 4 wherein the first member is a tube, the rod is positioned within the tube and the lower end of the rod is connected to the lever means at the point of intersection of the pair of levers closest to the lower end of the first member.

* * * * *